United States Patent Office 3,268,587
Patented August 23, 1966

3,268,587
PROCESS FOR PREPARING ALKYLENE GLYCOL PRIMARY AMINE
Louis de Vries, Richmond, Calif., assignor to Chevron Research Company, a corporation of Delaware
No Drawing. Filed Mar. 28, 1963, Ser. No. 268,601
2 Claims. (Cl. 260—584)

This invention relates to a novel alkylene glycol amine and its process of preparation.

Alkylene glycol amines are useful as synthetic oils and also as dispersants for a variety of compositions, such as paints, fuels, lubricants and the like. They also provide an important class of intermediates for the production of glycol amine substituted macro-molecules which have utility as ashless detergents in lubricating oils and fuels.

It has now been found that a useful new alkylene glycol amine is provided in the compound having the formula $$H_2N(R_1O)_nR_2$$

in which $R_1$ is an alkylene group of from 2 to 7 carbon atoms, $n$ is an integer from about 5 to about 680 and $R_2$ is selected from the group consisting of alkyl radicals of from 1 to 18 carbon atoms and acyl radicals of from 2 to 18 carbon atoms, said alkylene glycol amine having a molecular weight from between about 220 and 30,000.

It has also been found that the primary glycol amine of the above type is suitably prepared by ammonolysis of the tosylate ester of polyalkylene glycol having the formula $$HO(R_1O)_nR_2$$

in which $R_1$ is an alkylene group of from 2 to 7 carbon atoms, $n$ is an integer from about 5 to about 680 and $R_2$ is selected from the group consisting of alkyl radicals of from 1 to 18 carbon atoms and acyl radicals of from 2 to 18 carbon atoms, said polyalkylene glycol having a molecular weight from between about 220 and 30,000.

The alkoxy and acyloxy polyalkylene glycol primary amines of the present invention are particularly suitable as intermediates for the preparation of polyglycol substituted polymeric ashless detergents. The terminal alkoxy and acyloxy groups diminish the possibility of side reactions and the formation of undesirable by-products, and the primary amine group reacts with dicarboxylic acid groups to provide the exceptionally stable imide linkage.

In accordance with the process of the present invention, the alkoxy or acryloxy polyalkylene glycol is converted to the tosylate ester by reaction with a sulfonic acid compound, such as paratoluene sulfonic acid or paratoluene sulfonyl chloride. The tosylate ester is then reacted with an excess of ammonia to form the alkoxy or acyloxy polyalkylene glycol amine salt of the toluene sulfonic acid. This salt is then cleaved by reaction with an alkaline material, such as potassium carbonate, to give the polyalkylene glycol amine and alkali metal salt of paratoluene sulfonic acid.

The following polyalkylene glycol amines are illustrative of a few of the species of compounds in accordance with the present invention:

$H_2N(CH_2CH_2O)_5CH_3$ $H_2N(CH_2CH_2O)_{40}CH_3$ $H_2N(CH_2CH_2O)_{600}CH_3$ $H_2N(CH_2CH_2CH_2O)_{10}C_{18}H_{37}$

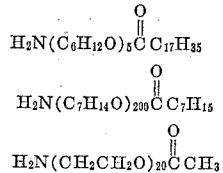

For present purposes the alkoxy polyethylene glycol primary amines are preferred, particularly those having molecular weights of from about 220 to about 10,000. The polyethylene glycol starting materials are commonly available, and the alkoxy polyglycol amine products lend themselves readily to the production of polyethylene glycol substituted polymeric compounds.

Further illustrations of the preparation and use of an alkylene glycol amine representative of the compounds of this invention are given in the following examples. The proportions are on weight basis unless otherwise specified.

Example 1

In this example, a methoxy polyethylene glycol primary amine in which the polyethylene glycol has a molecular weight of about 550 is prepared. 2200 g. of methoxy polyethylene glycol (550 mol. wt.) is dried by azeotroping with benzene and dissolved in 1900 cc. tetrahydrofuran (dried by distilling over lithium aluminum hydride). Under exclusion of moisture, 235 g. of a 51% sodium hydride suspension in oil is slowly added and the mixture refluxed 18 hours, cooled and centrifuged. The neutralization equivalent of the product is 595. The clear tetrahydrofuran solution of the sodium alcoholate is added to a solution of 1360 g. p-toluene-sulfonyl chloride in 1300 cc. dry tetrahydrofuran with external ice cooling at such a rate that the temperature never exceeds 68° F. The mixture is stirred overnight at ambient temperature, then transferred to a pressure vessel purged with dry nitrogen; there are added 2000 g. of dry ammonia and the sealed vessel is heated 5 hours at 130° F. Then, the ammonia in excess is allowed to evaporate, the reaction mixture is stripped of most of the solvent, cooled, and treated with ice water until no more precipitation occurs. It is then filtered, and the clear filtrate saturated with $K_2CO_3$. The water layer is discarded and the organic phase azeotroped to dryness with benzene, filtered and stripped. The final product has a neutralization equivalent of about 550 and an acetyl equivalent of about 600 which corresponds to the theoretical for the methoxy polyethylene glycol primary amine.

Example 2

A maleic anhydride adduct is prepared from the copolymer of a synthetic mixture of 1-dodecene and 1,9-octadecadiene in 15:1 molar ratio having a molecular weight of about 300,000. 25 g. of the copolymer in 60 g. of cetane is heated for about 24 hours at a temperature of about 215° C. with 10 g. of maleic anhydride and 0.5 g. of bis(dibutylhydroxyphenyl)methane. The polymer is precipitated with acetone and redissolved in benzene four times. The infrared absorbance for succinic anhydride groups at 1760 cm.$^{-1}$ indicates an anhydride equivalent of about 4100 which corresponds to an approximate ratio of pendant alkyl groups to pendant alkenyl succinic anhydride of 22:1. The "anhydride equivalent" is the number of grams of polymer which combine with 98 g. of maleic anhydride.

25 g. of maleic anhydride adduct is dissolved in 75 g. of an aromatic hydrocarbon mixture boiling about 170–200° C. The solution is then heated for about 24 hours with 6 g. of methoxy polyethylene glycol primary amine prepared as in Example 1, but in which the polyethylene glycol has a molecular weight of about 425 (2.3 theories). The heating is carried out at about 170° C. The methoxy polyethylene glycol succinimide is formed as the reaction product. The product is precipitated four times with acetone.

*Example 3*

A lubricating oil composition containing 2.8% by weight of the above methoxy polyethylene glycol succinimide in 150 neutral oil is prepared. This oil is a conventional solvent-refined California paraffin base mineral lubricating oil having a viscosity of 150 SSU at 100° F. and a viscosity index of about 85. The viscosity index of the oil containing the succinimide is raised to about 140, showing a marked improvement of the viscosity-temperature characteristics of the base oil. The oil is found to have excellent detergent characteristics in engine tests.

I claim:

1. A process for preparing primary polyethylene glycol amines which comprises heating at a temperature of about 130° F. a molar excess of ammonia with the tosylate ester of methoxy polyethylene glycol having a molecular weight between about 220 to about 10,000, cleaving the resulting toluene sulfonic acid amine salt with an alkali metal carbonate and purifying the methoxy polyethylene glycol primary amine by azeotropic distillation.

2. A process for preparing primary polyethylene glycol amines which comprises heating at a temperature of about 130° F. a molar excess of ammonia with the tosylate ester of methoxy polyethylene glycol having a molecular weight of about 550, cleaving the resulting toluene sulfonic acid amine salt with potassium carbonate and purifying the methoxy polyethylene glycol primary amine by azeotropic distillation.

References Cited by the Examiner

UNITED STATES PATENTS 2,355,337  8/1944  Spence _____ 260—584
3,070,552  12/1962  Tesoro et al. _____ 260—584 X CHARLES B. PARKER, *Primary Examiner.*

A. H. SUTTO, *Assistant Examiner.*